(12) United States Patent
Komano et al.

(10) Patent No.: US 7,899,830 B2
(45) Date of Patent: Mar. 1, 2011

(54) MUSIC REPRODUCING APPARATUS AND COMPUTER-READABLE MUSIC REPRODUCING PROGRAM FOR THE APPARATUS

(75) Inventors: Takeshi Komano, Iwata (JP); Hiroki Nakazono, Hamamatsu (JP); Shigehiko Mizuno, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 253 days.

(21) Appl. No.: 11/330,546

(22) Filed: Jan. 11, 2006

(65) Prior Publication Data
US 2006/0171682 A1  Aug. 3, 2006

(30) Foreign Application Priority Data
Jan. 12, 2005 (JP) .............................. 2005-004966

(51) Int. Cl.
G06F 7/00 (2006.01)
G06F 17/30 (2006.01)

(52) U.S. Cl. ...................... 707/748; 707/752; 715/727; 386/96

(58) Field of Classification Search .................. 715/727
See application file for complete search history.

(56) References Cited

U.S. PATENT DOCUMENTS

| 5,627,657 A | 5/1997 | Park et al. |
| 7,352,955 B2 | 4/2008 | Kotani et al. |
| 2002/0089529 A1 | 7/2002 | Robbin |
| 2003/0198098 A1 | 10/2003 | Fujioka et al. |

FOREIGN PATENT DOCUMENTS

| CN | 1146047 A | 3/1997 |
| JP | 2001-109470 | 4/2001 |
| JP | 2003-016764 A | 1/2003 |

(Continued)

OTHER PUBLICATIONS iTunes Version 4.2 Screenshots, Dec. 18, 2003, Apple, Figs. 1-11.*

(Continued)

*Primary Examiner*—Cam Y T Truong
(74) *Attorney, Agent, or Firm*—Morrison & Foerster LLP

(57) ABSTRACT

A music reproducing apparatus stores, in a storage device, playlist data that defines an order in which a plurality of music data sets are reproduced, displays the playlist data on a display unit, and reproduces music items in the order defined by the playlist data. The playlist data is formed of a plurality of item data sets each corresponding to a music data set. If a user defines an item data set corresponding to a music data set as one to be reproduced, the defined item is provided with a reproduction mark of "check" and displayed with the reproduction mark on the display unit. On the display unit there is also displayed a total reproduction time D13 in which the reproduction time of music data sets defined as those to be reproduced is summed. Furthermore, item data sets for music data sets that are defined as those to be reproduced but are not stored in the storage device are provided with an irreproducibility mark of "???" and displayed with the irreproducibility mark on the display unit. The thus-configured music reproducing apparatus allows the user to establish, with simple operation, the order in which a plurality of music items are reproduced.

3 Claims, 5 Drawing Sheets

FOREIGN PATENT DOCUMENTS

| | | |
|---|---|---|
| JP | 2004-005780 A | 1/2004 |
| JP | 2004-030792 A | 1/2004 |
| JP | 2004-070983 A | 3/2004 |
| JP | 2004-145997 A | 5/2004 |
| JP | 2004-184675 A | 7/2004 |

OTHER PUBLICATIONS

Wikipedia iTunes Version History, Version 4.2.*
Dell Home Systems Notebooks, Oct. 19, 2003, www.archive.org.*
iTunes Version 4.2 Screenshots, Dec. 18, 2003, Apple Computer Inc., Figs. 1, 12-15.*
Apple, Inc., "Apple iTunes 4.6 release information," www.apple.com, Oct. 10, 2004, XP002376064.
Screenshots iTunes 4.6, Apr. 6, 2006, XP002376065.
KMP3 Developing Team: Kmp3 Development News, internet article, Jan. 27, 2000, XP002376219.
Media Monkey Developing team: "Media Monkey Web Help: Automatically Updating the Library File Monitor Configuration," www.mediamonkey.com, Jun. 3, 2004, XP002376221.
Kelticdanor: "XMP lay V3 Suport Site: The Playlist Panel," www.support.xmplay.com, 2004, XP002376220.
Mike: "Truncating Long File Names and Displaying an Ellipses," CODEGURU, Jul. 29, 1999, XP002376222.
DENS@CS.BRANDEIS.EDU: "Playlist editor does not show full pathname for uris," XMMS BUZGILLA, Sep. 11, 2002, XP002376223.
Office Action mailed Mar. 4, 2009, for Japanese Patent Application No. 2005-004966, with Partial English Translation, five pages.
Office Action mailed Jul. 10, 2009, for Chinese Patent Application No. 2006100009124, with English Translation, 10 pages.

* cited by examiner (A)

| item data set |
|---|
| item data set |
| item data set |
| : |

(B)

| number | check mark | title | path | performance time | entry count |
|---|---|---|---|---|---|

MUSIC REPRODUCING APPARATUS AND COMPUTER-READABLE MUSIC REPRODUCING PROGRAM FOR THE APPARATUS

BACKGROUND OF THE INVENTION

1. Field of the Invention

The present invention relates to a music reproducing apparatus which stores, in a storage device, playlist data defining the order in which a plurality of music items are reproduced, displays the playlist data on a display unit, and reproduces the music items in the order defined by the playlist data. The present invention also relates to a computer-readable music reproducing program for the apparatus.

2. Description of the Related Art

There has been an automatic performance apparatus in which a plurality of music data sets each representative of a music piece and a music order data set representative of the order in which the plurality of music data sets are reproduced are stored in a directory so that the music data sets are reproduced in the order defined by the music order data (see Japanese Patent Laid-Open Publication No. 2001-109470).

The above-described conventional apparatus is capable of reproducing all the music data sets stored in a directory in the order defined by music order data, however, the conventional apparatus is unable to reproduce a specific music data set of all the music data sets or sequentially reproduce specific music data sets of all the music data sets. To change the contents of a created music order data set, furthermore, the conventional apparatus requires its user to delete a music data set/sets from a list or add a music data set/sets to the list in editing mode in which music order data is edited. In a case where the user needs to select music data sets and arrange the music data sets in order of reproduction so that the reproduction of the music data sets is completed in a specified time period, for instance, the user has to have a multiplicity of possible music data sets and grasp the reproduction time of the respective music data sets, repeating the procedure of entering and deleting a combination of music data sets from among the multiplicity of music data sets until the user finds a desired combination. Such procedure is quite troublesome for the user.

When the user has a large number of music data sets to enter in the list, in addition, it is difficult for the user to recognize which data sets have been entered and which not. Furthermore, there can be a case in which a music data set is deleted although the music data set has been entered in music order data. In the conventional apparatus, however, it is difficult for the user to keep track of entry and deletion of music data sets because the user cannot recognize the deletion of a music data set until the music data sets are reproduced in accordance with music order data.

SUMMARY OF THE INVENTION

The present invention was accomplished to solve the above-described problems, and an object thereof is to provide a music reproducing apparatus which provides users with ease-of-use, and a computer-readable music reproducing program for the apparatus. Referred to as a music item in this description is musical content data for reproducing music which includes the above-described music data (e.g., MIDI data) and other data such as audio data, video data, karaoke data, ringing melody data, and data in which the above-described various data is combined. Referred to as playlist data is data, such as the above-described music order data, representative of an order in which music items are reproduced.

In order to achieve the above-described object, it is a feature of the present invention to provide a music reproducing apparatus storing, in a storage device, playlist data defining an order in which a plurality of music items are reproduced, displaying the playlist data on a display unit, and reproducing the music items in the order defined by the playlist data, the music reproducing apparatus comprising a reproduction defining portion for defining, in the playlist data, reproduction defining data which defines whether or not to reproduce the respective music items specified by the playlist data.

The above-described feature enables a user to make a change with simple operation so that a music item entered in the playlist data is not to be reproduced, also allowing the user to make a change with simple operation so that a music item that the user has defined as one not to be reproduced is changed to one to be reproduced. This feature thus facilitates user's operation for defining music items to be reproduced.

It is another feature of the present invention to provide a music reproducing apparatus wherein the playlist data contains reproduction time data representative of reproduction time of the respective music items, the music reproducing apparatus further comprising a total reproduction time display controlling portion for calculating total reproduction time of music items defined by the reproduction defining data as those to be reproduced by use of the reproduction time data on the respective music items and displaying the calculated total reproduction time on the display unit.

This feature allows the user to select, with simple operation, music items to be reproduced so that the total reproduction time of the music items falls within an appropriate range.

It is still another feature of the present invention is to provide a music reproducing apparatus further comprising a reproducibility display controlling portion for determining whether each of the music items defined by the reproduction defining data as one to be reproduced is in a state where the reproduction of the music item is available, and displaying on the display unit whether each of the music items is in a state where the reproduction of the music item is available. In this case, for instance, the music reproducing apparatus stores music items for reproduction in a music item storage device while the reproducibility display controlling portion may determine whether music items defined by reproduction defining data as those to be reproduced are in a state where the reproduction of the respective music items is available by determining whether the music items are stored in the music item storage device.

This feature allows the user to recognize whether the user's desired music items are in a state where the reproduction of the respective music items is available. Since it is not essential to display on the display unit the reproducibility of music items that the user does not desire to reproduce, furthermore, the determination and display of the reproducibility of music items defined by the reproduction defining data as those not to be reproduced may be omitted to simplify processing and eliminate complicated display.

It is a further feature of the present invention is to provide a music reproducing apparatus further comprising a reproduction-determined item display controlling portion for displaying on the display unit at least ones of music items defined as those to be reproduced and music items defined as those not to be reproduced by the reproduction defining data.

When the display unit displays only the music items to be reproduced and does not display unnecessary music items not to be reproduced, the above-described feature facilitates user's recognition of music items to be reproduced, resulting in easy edit of playlist data. When the display unit displays only the music items not to be reproduced, on the other hand, this feature makes it easy for the user to edit playlist data such as picking out possible items to be deleted from the playlist data or changing a music item entered as one not to be reproduced to as one to be reproduced.

It is still a further feature of the present invention is to provide a music reproducing apparatus wherein the music items are stored in a music item storage device, and the playlist data contains path data representative of location where the respective music items are stored in the music item storage device, the music reproducing apparatus further comprising a path display controlling portion for displaying on the display unit the storage location defined by the path data from the bottom.

Even in the case of narrow area for displaying playlist data on the display unit, the above-described feature allows the user to recognize at a glance the folder in which each music item is stored.

It is another feature of the present invention is to provide a music reproducing apparatus comprising a preexisting entry notifying portion for determining at the addition of a music item to the playlist data whether the music item to be added has been already entered in the playlist data and notifying, if the music item has been already entered, that the music item has been already entered. In this case, for instance, the preexisting entry notifying portion may display an alert that the music item has been already entered or an entry count, or emit a beep warning that the music item has been already entered.

This feature allows the user to recognize at a glance that the music item which the user intends to add has been already entered, making it easy for the user to make an addition of a music item to playlist data especially when the user does not desire overlapping entry of a music item or contrarily when the user desires overlapping entry.

It is still another feature of the present invention is to provide a music reproducing apparatus comprising a reproducibility display controlling portion for determining at a refreshed display of the playlist data on the display unit whether each of the music items entered in the playlist data is in a state where the reproduction of the music item is available and displaying on the display unit whether each of the music items is in a state where the reproduction of the music item is available. In this case, for instance, the music reproducing apparatus stores music items for reproduction in a music item storage device while the reproducibility display controlling portion may determine whether music items specified by playlist data are in a state where the reproduction of the respective music items is available by determining whether the music items are stored in the music item storage device.

This feature allows the user to recognize whether music items entered in the playlist data are in a state where the reproduction of the respective music items is available without actually reproducing the music items entered in the playlist data, which facilitates user's load required to edit playlist data.

Furthermore, the present invention can be embodied not only as an invention of a music reproducing apparatus but also as an invention of a computer-readable program and a method applied to the apparatus.

BRIEF DESCRIPTION OF THE DRAWINGS

FIG. 5(A) is a data format of playlist data, and FIG. 5(B) is a data format of respective item data sets of FIG. 5(A);

DESCRIPTION OF THE PREFERRED EMBODIMENT

Figure 1:
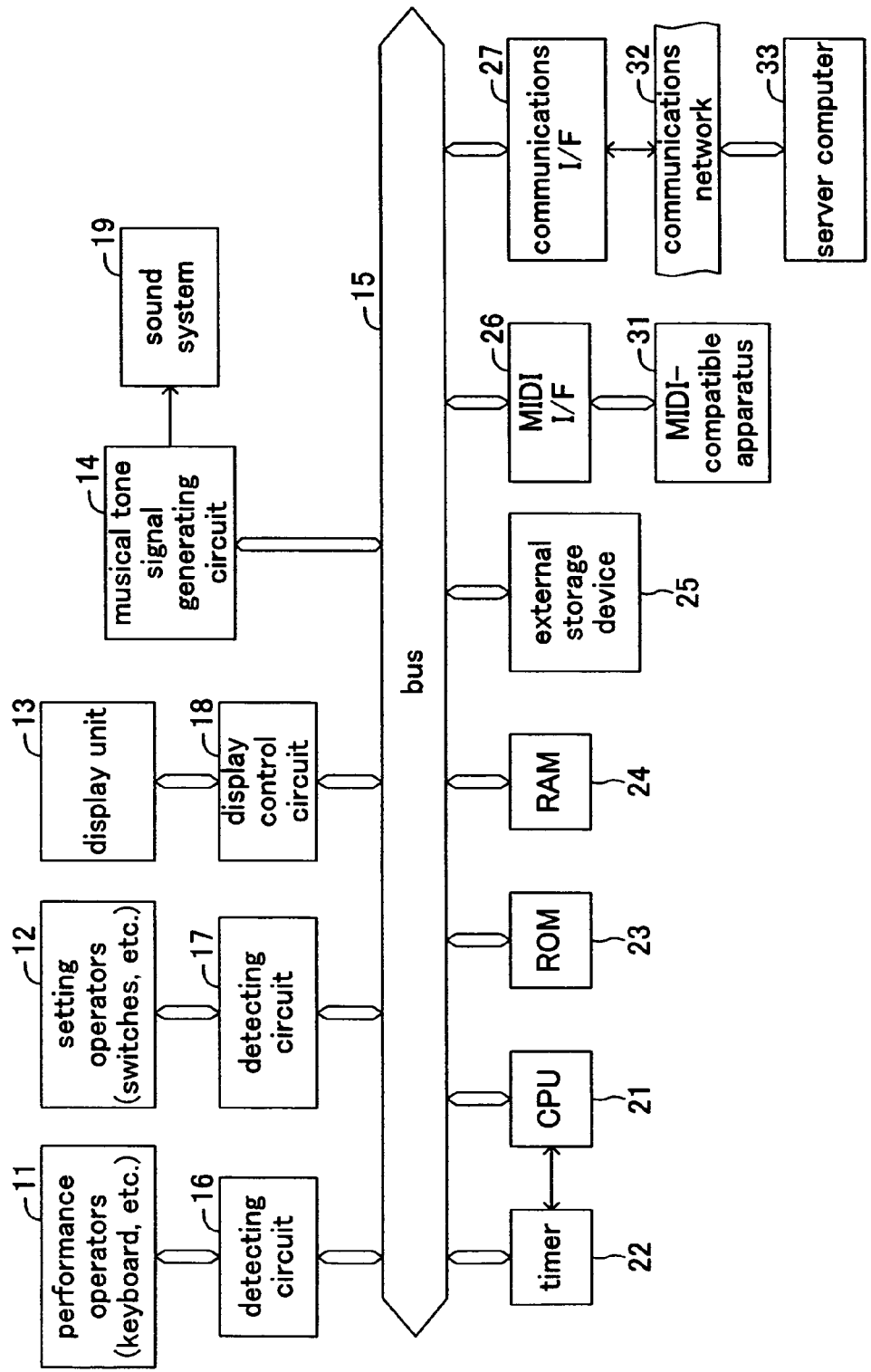
FIG. 1 is a block diagram showing the general arrangement of an electronic musical instrument according to an embodiment of the present invention.

An embodiment of the present invention will now be described with reference to the drawings. FIG. 1 is a block diagram schematically showing an electronic musical instrument to which a music reproducing apparatus and a music reproducing program according to the present invention are applied. The electronic musical instrument includes performance operators 11, setting operators 12, a display unit 13 and a musical tone signal generating circuit 14.

The performance operators 11 are formed of a plurality of performance operators (e.g., a plurality of keys) for specifying the pitch of musical tones to be generated. The operation of the respective performance operators is detected by a detecting circuit 16 connected to a bus 15. The setting operators 12 are provided on an operating panel of the electronic musical instrument and formed of a plurality of setting operators for specifying the operating mode of respective parts of the electronic musical instrument. The operation of the respective setting operators is detected by a detecting circuit 17 connected to the bus 15. The display unit 13 is configured by a liquid crystal display, a CRT or the like, displaying characters, numerals, graphics, etc. What is displayed on the display unit 13 is controlled by a display control circuit 18 that is connected to the bus 15.

The musical tone signal generating circuit 14, which is connected to the bus 15, generates musical tone signals on the basis of performance data and musical tone control data supplied under the control of a later-described CPU 21, and outputs the generated musical tone signals to a sound system 19. The sound system 19, which includes speakers, amplifiers and the like, emits musical tones corresponding to the musical tone signals.

The electronic musical instrument also includes a CPU 21, timer 22, ROM 23 and RAM 24 that are connected to the bus 15 and compose the main body of a microcomputer. The electronic musical instrument also has an external storage device 25, a MIDI interface circuit 26 and a communications interface circuit 27. The external storage device 25 includes various storage media such as hard disk HD and flash memory previously incorporated in the electronic musical instrument, and compact disk CD and flexible disk FD attachable to the electronic musical instrument. The external storage device 25 also includes drive units for the storage media to enable storing and reading of voluminous data and programs.

Figure 2:
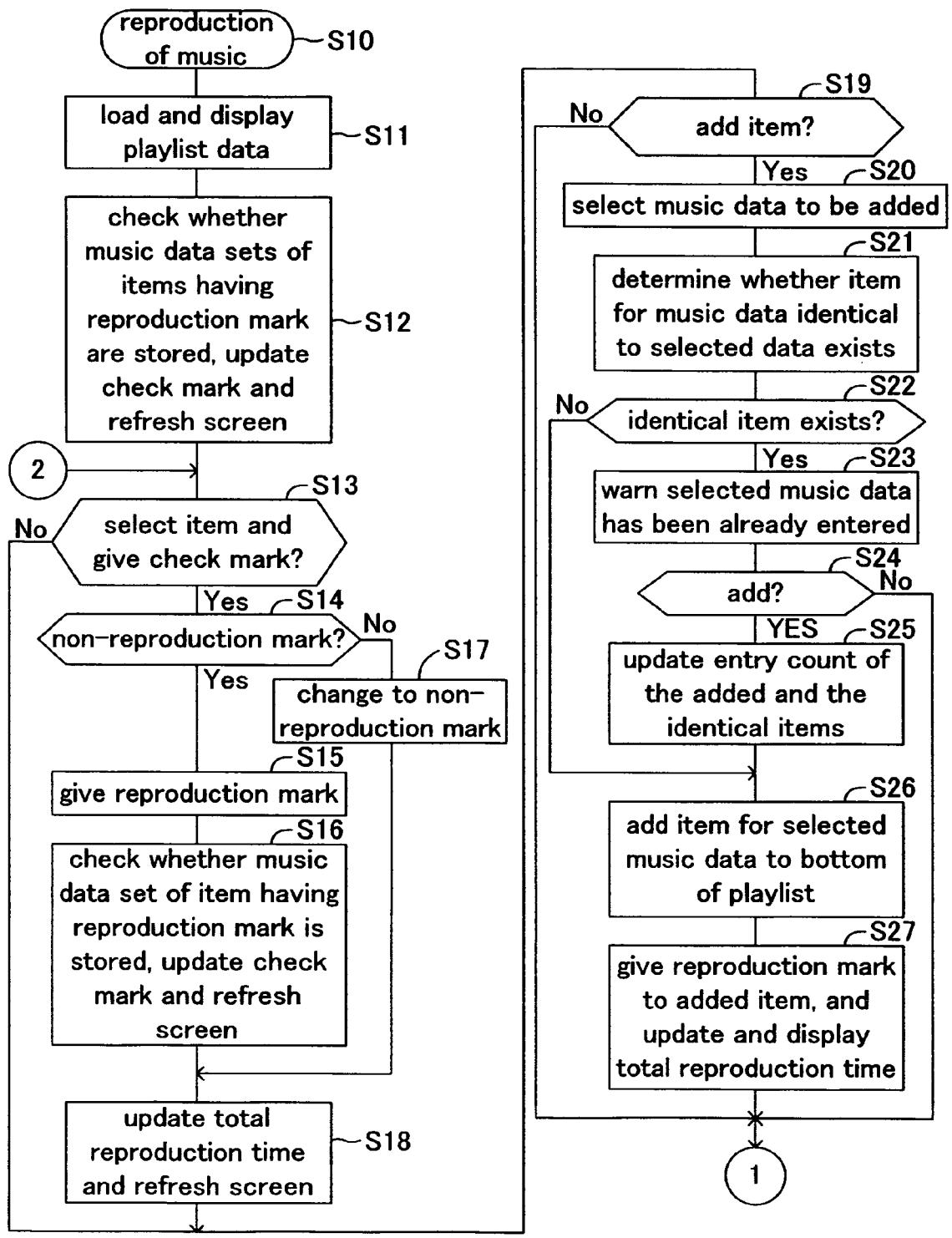
FIG. 2 is a flowchart showing the first half of a music reproducing program run on the electronic musical instrument.
Figure 3:
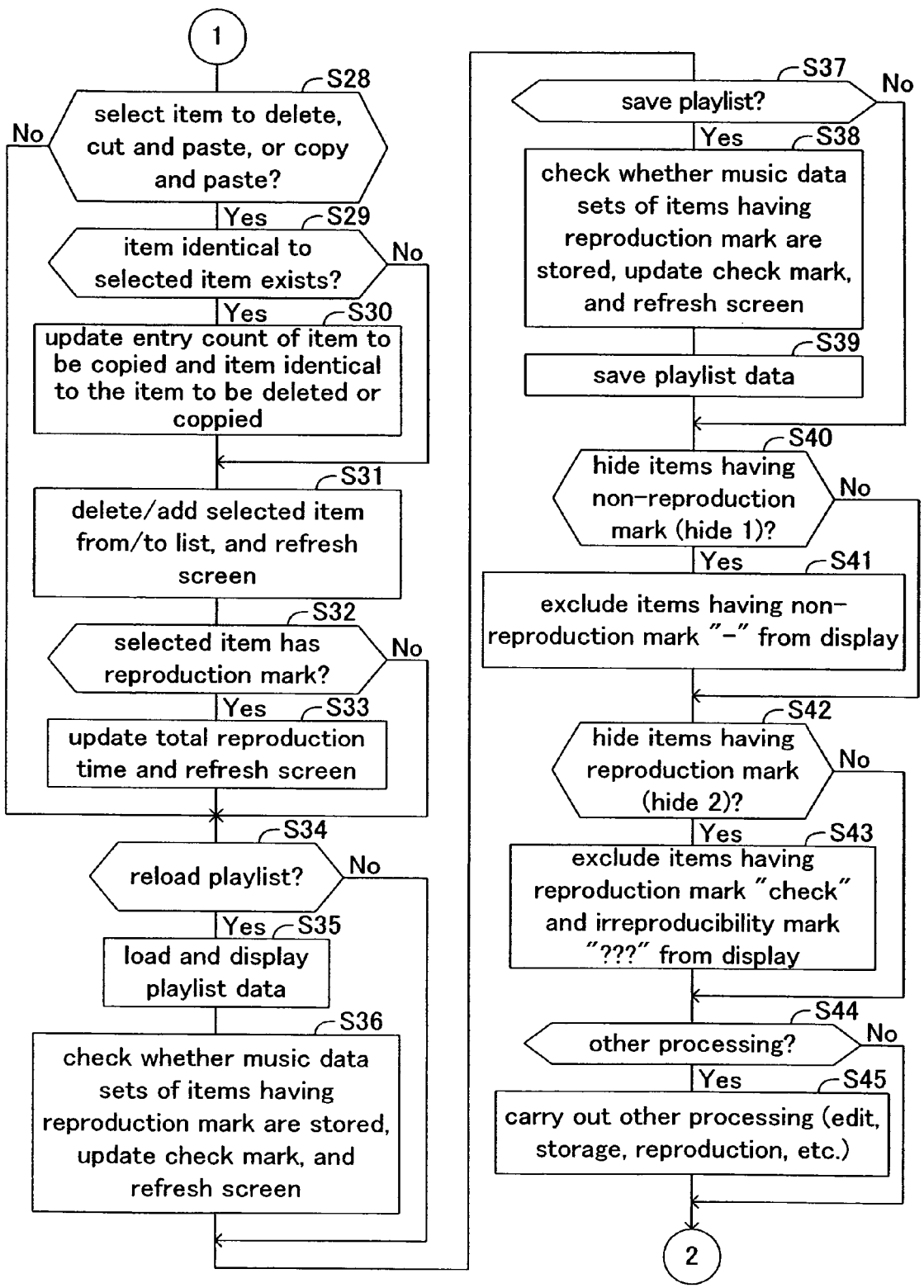
FIG. 3 is a flowchart showing the latter half of the music reproducing program.
Figures 4, 5:
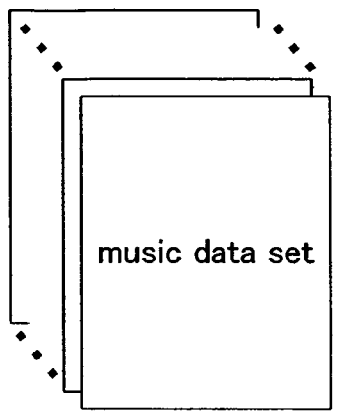
FIG. 4 is a diagram showing music data sets stored in an external storage device shown in FIG. 1.

In the present embodiment, particularly, stored in the hard disk HD, flash memory or the like are the music reproducing program (FIGS. 2 and 3) and a plurality of music data sets (see FIG. 4) each representative of a music piece. In the hard disk HD, flash memory, etc. there is also stored playlist data. The music reproducing program and music data sets are previously stored in the hard disk HD, flash memory or the like, supplied from a compact disk CD, flexible disk FD or the like to the hard disk HD, flash memory or the like, or supplied from a later-described MIDI compatible apparatus 31 or a server computer 33 to the hard disk HD, flash memory or the like.

As shown in FIG. 5(A), the playlist data is formed of a plurality of item data sets each representative of information about a music data set entered by the user. As shown in FIG. 5(B), each item data set is formed of number data, check mark data, title data, path data, performance time data and entry count data. The number data indicates an entry number of a music data set entered in the playlist data. As for the music data set defined as one to be reproduced, the number data indicates the position of the music data set in the order in which music data sets are reproduced. The check mark data indicates whether the music data set has been defined as one to be reproduced. Also indicated by the check mark data is a state in which the music data set is not stored in the external storage device 25, so that the music data set is irreproducible. The title data represents the title of a music piece represented by the music data set. The path data represents the location where the music data set is stored in the external storage device 25, i.e., the folder in which the music data set is stored and the filename of the music data set in the folder. The performance time data indicates the performance time required for reproducing the music data set. The entry count data indicates the number of counts for which the music data set has been entered in the playlist data.

To the MIDI interface circuit 26 there is connected a MIDI-compatible apparatus 31 such as a different electronic musical instrument or a personal computer. The MIDI interface circuit 26 enables the electronic musical instrument to exchange various programs and data with the MIDI-compatible apparatus 31. The communications interface circuit 27 enables the electronic musical instrument to connect with the server computer 33 through a communications network 32 such as the Internet to receive and transmit various programs and data from/to the server computer 33.

Next explained will be the operation of the embodiment configured as described above. Manipulation on the setting operators 12 by a user causes the music reproducing program to start. The music reproducing program is started at step S10 shown in FIG. 2. At step S11 the CPU 21 reads out playlist data stored in the external storage device 25 and loads the playlist data into the RAM 24 to display, in cooperation with the display control circuit 18, the loaded playlist data on the display unit 13. In the initial state where any playlist data is not stored yet in the external storage device 25, by the process of step S11, in the RAM 24 there is provided a storage area for playlist data, the storage area not including any playlist data. In this description, "load" refers to writing various data into the RAM 24, while "save" refers to writing data in the RAM 24 into the external storage device 25.

Figure 6:
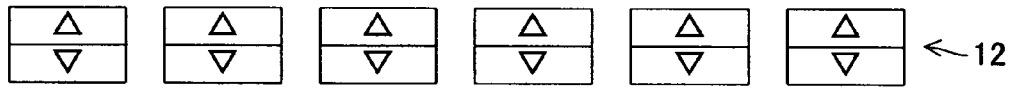
FIG. 6 is an example displayed on a display unit shown in FIG. 1.

A screen displaying the playlist data is shown in FIG. 6. In a playlist D10 depicted in the screen, on the basis of respective item data sets in the playlist data, there are shown entry number (1, 2 . . . ), check mark (check, -, ???), music title (aaaa, bbbb . . . ), path ( . . . /rock/aaaa.wav, . . . /rock/aaaa.wav . . . ), performance time of music data (03:52, 2:30 . . . ), and entry count (1, 2 . . . ) in this order. As for the check mark, "check" indicates the state where the music data set is defined as one to be reproduced, "-" indicates the state where the music data set is defined as one not to be reproduced, while "???" indicates that the music data set is not stored in the external storage device 25, so that the music data set is irreproducible. As for the performance time, "03:52" indicates 3 minutes 52 seconds.

As for the path, it is noteworthy that the storage location of a music data set is displayed from the bottom of its address. Take, for example, a music data set having a path of "c:/audio/user/suser1/rock/aaa.wav". If the path is displayed from the top on a display screen whose display area for the path is narrow, the path will be shown as following: "c:/audio/user/ . . . ", failing to allow the user to recognize the folder in which the music data set is stored. In the present embodiment, on the other hand, the path is displayed from the bottom: " . . . /rock/aaa.wav". In such scheme of displaying a path, letters to be displayed from the bottom of the address may be determined on the basis of the number of displayable letters. Alternatively, letters to be displayed from the bottom of the address may be determined on the basis of the number of displayable dots. In spite of narrow area for displaying a path, this scheme allows the user to recognize at a glance the folder in which the music data set is stored.

Also displayed by the process of step S11 on the display screen are an elapsed time D11 from the start of the reproduction of a currently reproduced music data set, an elapsed time D12 from the start of the reproduction of music data sets defined as those to be reproduced, and a total reproduction time D13 required to reproduce the music data sets defined as those to be reproduced. As for the display of the elapsed times D11, D12, an elapsed time of 1 minute 20 seconds, for example, is displayed as follows: "01:20". As for the total reproduction time D13, a total reproduction time of 54 minutes 30 seconds, for example, is displayed as follows: "54:30".

On the display screen there are also displayed, by the process of step S11, in associated relation with the location of the respective operators contained in the setting operators 12, operator marks representative of the function of the respective operators: "↑", "↓", "check", "add", "save", "reload", "delete", "paste", "cut", "copy", "hide 1", and "hide 2".

The operator marks of "↑" and "↓" represent the directive function for upwardly or downwardly moving a cursor to point at an item in the playlist. The operator mark of "check" is used to give or remove "check" as a check mark, also representing the directive function for checking whether a music data set corresponding to the item data to which "check" is given is stored in the external storage device 25. The operator mark of "add" represents the directive function for adding an item data set to the playlist data in the RAM 24. The operator mark of "save" represents the directive function for writing the playlist data in the RAM 24 into the external storage device 25. The operator mark of "reload" represents the directive function for reading the playlist data stored in the external storage device 25 and replacing the current playlist data in the RAM 24 with the read playlist data. The operator mark of "delete" represents the directive function for deleting an item data set in the playlist data in the RAM 24. The operator marks of "paste", "cut" and "copy" represent the directive functions for cutting and pasting, or copying and pasting an item data set in the playlist data in the RAM 24. The operator mark of "hide 1" represents the directive function for not displaying items to which a non-reproduction mark of "-" is given as the check mark in the playlist and displaying only the items to which a reproduction mark of "check" or an irreproducibility mark of "???" is given as the check mark. The operator mark of "hide 2" represents the directive function for not displaying items to which the reproduction mark of "check" or the irreproducibility mark of "???" is given as the check mark in the playlist and displaying only the items to which the non-reproduction mark of "-" is given as the check mark.

After the process of step S11, the CPU 21 checks at step S12 whether music data sets specified by the item data sets to which the reproduction mark of "check" is given in the playlist data in the RAM 24 are stored in the external storage device 25. In other words, the CPU 21 determines whether the music data sets are able to be reproduced, and updates the item data sets, i.e., the playlist data. More specifically, when the music data sets are stored in the external storage device 25, the CPU 21 maintains the check mark data without modification. When the music data sets are not stored in the external storage device 25, on the other hand, the CPU 21 modifies the check mark data to the data representative of the irreproducibility mark of "???". At step S12 there is also updated the contents displayed on the display unit 13 in accordance with the updated playlist data.

After the processes of steps S11, S12, the CPU 21 repeatedly executes circulating processing formed of steps S13 to S45. During the circulating processing, if the user operates the operator associated with the operator mark of "↑" or "↓" contained in the setting operators 12 to move the cursor upward or downward to select an item in the playlist, and operates the operator associated with the operator mark of "check" to give a check mark, the CPU 21 gives "Yes" at step S13 and executes the processes of steps S14 to S18.

If the check mark data for the selected item represents the non-reproduction mark of "-", the CPU 21 gives "Yes" at step S14, i.e., determines that the reproduction mark has not been given to the item and gives at step S15 the reproduction mark to the selected item. In other words, at step S15 the CPU 21 changes the check mark data for the selected item to the data representative of reproduction mark of "check". The CPU 21 then proceeds to step S16 to check in a manner similar to the process of step S12 whether a music data set specified by the above-selected item data set to which the reproduction mark of "check" is additionally given is stored in the external storage device 25. In other words, the CPU 21 determines whether the music data set is able to be reproduced, and updates the item data set. At step S16 there are also updated the contents displayed on the display unit 13 in accordance with the updated item data.

If the check mark data for the selected item represents the reproduction mark of "check" or the irreproducibility mark "???", the CPU 21 gives "No" at step S14, i.e., determines that the reproduction mark has been given to the item and modifies at step S17 the check mark data for the above-selected item to the data representative of the non-reproduction mark of "-". After the process of step S16 or step S17, the CPU 21 sums, at step S18, the performance time represented by the performance time data contained in the respective item data sets having the check mark data representative of the reproduction mark of "check" and displays the summed value as the total reproduction time D13 on the display unit 13.

During the circulating processing formed of steps S13 to S45, furthermore, if the user operates the operator associated with the operator mark of "add" included in the setting operators 12, the CPU 21 gives "Yes" at step S19 and executes processes of steps S20 to S27. At step S20, the CPU 21 displays a screen for selecting a music data set on the display unit 13 to prompt the user to select a desired music data set. When the user selects a music data set, the CPU 21 determines at step S21 whether the playlist data contains an item data set for a music data set that matches the selected music data set. In other words, the CPU 21 determines whether the selected music data set has been already entered. If the selected music data set has been already entered, the CPU 21 gives "Yes" at step S22, and at step S23 displays on the display unit 13 a warning that the selected music data set has been already entered and an inquiry about whether the selected music data set is to be added to the playlist data. In replacement for or in addition to this display, a warning beep may be emitted.

If the user then operates any one of the setting operators 12 to add the music data set, the CPU 21 gives "Yes" at step S24 and proceeds to step S25. If the user does not select to add the music data set, on the other hand, the CPU 21 gives "No" at step S24 and proceeds to steps S28 and later without carrying out the processes of later-described steps S25 to S27. At step S25 the CPU 21 generates a new item data set for the selected music data set, while adding "1" to the entry count data contained in the already entered same item data set in the playlist data to update the entry count data. At step S25 the CPU 21 also sets the entry count data contained in the newly generated item data at the same value as that of the above-updated entry count data.

After the process of step S25, the CPU 21 adds, at step S26, the newly generated item data set to the bottom of the playlist data. If the CPU 21 gives "No" at step S22, i.e., determines that the playlist data does not contain an item data set for the music data set identical to the selected music data set, the CPU 21 adds, at step S26, the item data set for the selected music data set to the bottom of the playlist data without carrying out the processes of steps S23 to S25. At step S27 the CPU 21 then sets the check mark data of the item data set added to the playlist data at the data representative of the reproduction mark of "check". At step S27, in a manner similar to the above-described process of step S18, the CPU 21 updates the total reproduction time of the items to which the reproduction mark of "check" is given and displays the updated total reproduction time on the display unit 13.

During the circulating processing formed of the above-described steps S13 to S45, furthermore, if the user operates operators associated with the operator mark of "↑", "↓", "delete", "paste", "cut", or "copy" included in the setting operators 12 to delete an item from the item list, to move an item (i.e., cut and paste) or to copy an item (i.e., copy and paste), the CPU 21 gives "Yes" at step S28, and then carries out processes of steps S29 to S33.

At step S29 it is determined whether the playlist contains another item identical to the selected item. If so, the CPU 21 updates, at step S30, the entry count data on the item to be copied and on the item identical to the item to be deleted or copied. When the deletion of an item is sought, more specifically, the entry count data on the item identical to the item to be deleted is updated such that "1" is reduced from the entry count. When the copy of an item is sought, the entry count data on the item to be copied and on the identical item is updated such that "1" is added to the entry count. When the move of an item is sought, any substantial processing is not carried out at step S30.

At step S31 the selected item is deleted from the playlist or added to the playlist. When the deletion of the item is sought, more specifically, item data on the item to be deleted is erased from the playlist data. When the move of the item is sought, the item data on the item to be moved is erased from the playlist data, and is newly added to the playlist data. When the copy of the item is sought, the item data on the item to be copied is added to the playlist data. To move or copy an item, an operator associated with the operator mark of "↑" or "↓" is operated to designate where the item is moved or copied. For instance, the item to be moved or copied is inserted after a designated item. Along with such update of the playlist data, the contents of the playlist displayed on the display unit 13 are also updated.

At step S32 it is determined whether the check mark data contained in the item data on the selected item represents the reproduction mark of "check". If so, at step S33, in a manner similar to the above-described process of step S18, the CPU 21 updates the total reproduction time of the items to which the reproduction mark of "check" is given and displays the updated total reproduction time on the display unit 13. In this case as well, when the move of an item is sought, the update of the total reproduction time may be omitted.

During the circulating processing formed of the above-described steps S13 to S45, furthermore, if the user operates an operator associated with the operator mark of "reload" included in the setting operators 12, the CPU 21 gives "Yes" at step S34 and carries out the processes of steps S35, S36. At step S35, the playlist data stored in the external storage device 25 is loaded into the RAM 24. In this load, the playlist data previously stored in the RAM 24 is replaced with the playlist data stored in the external storage device 25. At step S36, in a manner similar to the above-described process of step S12, the CPU 21 checks whether music data sets specified by the item data sets to which the reproduction mark of "check" is given in the playlist data loaded into the RAM 24 are able to be reproduced, and updates the playlist data. At step S36 there are also updated the contents of the playlist displayed on the display unit 13.

During the circulating processing formed of the above-described steps S13 to S45, furthermore, if the user operates an operator associated with the operator mark of "save" included in the setting operators 12, the CPU 21 gives "Yes" at step S37 and carries out the processes of steps S38, S39. At step S38, in a manner similar to the above-described process of step S12, the CPU 21 checks whether music data sets specified by the item data sets to which the reproduction mark of "check" is given in the playlist data stored in the RAM 24 are able to be reproduced, and updates the playlist data. At step S38 there are also updated the contents of the playlist displayed on the display unit 13. At step S39 the thus-updated playlist data in the RAM 24 is saved in the external storage device 25.

Figure 7:
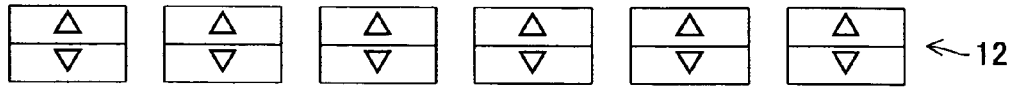
FIG. 7 is another example displayed on the display unit shown in FIG. 1.

During the circulating processing formed of the above-described steps S13 to S45, furthermore, if the user operates an operator associated with the operator mark of "hide 1" included in the setting operators 12, the CPU 21 gives "Yes" at step S40 and carries out the process of step S41. At step S41, the CPU 21 establishes a state in which items to which the non-reproduction mark of "-" representative of that the music data set is not to be reproduced is given are not displayed. As shown in FIG. 7, more specifically, displayed on the display unit 13 are only the items having the reproduction mark of "check" representative of that the music data set is to be reproduced and the irreproducibility mark of "???" representative of that the music data set is unable to be reproduced.

During the circulating processing formed of the above-described steps S13 to S45, furthermore, if the user operates an operator associated with the operator mark of "hide 2" included in the setting operators 12, the CPU 21 gives "Yes" at step S42 and carries out the process of step S43. At step S43, the CPU 21 establishes a state in which items to which the reproduction mark of "check" representative of that the music data set is to be reproduced and the irreproducibility mark of "???" representative of that the music data set is unable to be reproduced is given are not displayed. More specifically, displayed on the display unit 13 are only the items having the non-reproduction mark of "-" representative of that the music data set is not to be reproduced.

During the circulating processing formed of the above-described steps S13 to S45, furthermore, if the user operates any one of the setting operators 12 to instruct edit, storage, or reproduction of music data, the CPU 21 gives "Yes" at step S44 and carries out the process of step S45. At step S45, music data stored in the external storage device 25 is edited, or music data supplied from the MIDI apparatus 31 or the server computer 33 is stored in the external storage device 25.

When the user instructs to reproduce music data in accordance with the playlist, furthermore, the CPU 21 loads, on the basis of the playlist data stored in the RAM 24, music data sets of the items having the reproduction mark of "check" representative of that the music data set is to be reproduced from the external storage device 25 into the RAM 24 in the order indicated by the number data. The CPU 21 then reproduces the loaded music data sets in the indicated order. At the reproduction of music data, more specifically, performance data and musical tone control data contained in the music data is read out in accordance with the progression of a musical piece and supplied to the musical tone signal generating circuit 14. The musical tone signal generating circuit 14 generates musical tone signals corresponding to the supplied performance data and musical tone control data and emits musical tones through the sound system 19. The music data sets stored in the external storage device 25 are thus reproduced in the order defined by the playlist data.

In the above-described embodiment, as apparent from the above descriptions, respective item data sets included in the playlist data contain check mark data defining whether the music data set is to be reproduced. Due to the processes of steps S13 to S17 that allow changes to the check mark data, therefore, the present embodiment enables the user to make a change with simple operation so that a music data set entered in the playlist data is not to be reproduced, also allowing the user to make a change with simple operation so that a music data set that the user has defined as one not to be reproduced is changed to one to be reproduced. The present embodiment provided with such processes thus facilitates user's operation for defining music data sets to be reproduced. Furthermore, the respective item data sets contain reproduction time data representative of the reproduction time of a musical piece. The processes of steps S18, S27, S33 cause the total reproduction time of music data sets defined by the check mark data as those to be reproduced to be displayed, allowing the user to select, with simple operation, music data sets that the user desires to reproduce so that the total reproduction time of those music data sets falls within an appropriate range.

Furthermore, the processes of steps S12, S16, S36, S38 determine whether music data sets defined by check mark data as those to be reproduced are capable of being reproduced and displays on the display unit 13 whether the music data sets are capable of being reproduced, allowing the user to recognize whether the user's desired music data sets are in a state where the reproduction of the respective music data sets is available. Since it is not essential to display on the display unit 13 the reproducibility of music data sets that the user does not desire to reproduce, furthermore, the present embodiment does not carry out the determination and display of the reproducibility of music data sets that the user does not desire to reproduce, simplifying processing and eliminating complicated display. Furthermore, the processes of steps S12, S36 are carried out when the playlist data stored in the external storage device 25 is loaded into the RAM 24 to be newly displayed on the display unit 13, allowing the user to recognize whether music data sets entered in the playlist data are in a state where the reproduction of the respective music data sets is available without actually reproducing the music data entered in the playlist data, which facilitates user's load required to edit playlist data.

Furthermore, the processes of steps S40 to S43 enable selective display of music data. More specifically, item data on either of music data defined as those to be reproduced or music data defined as those not to be reproduced is displayed on the display unit 13. When the display unit 13 displays only the item data on music data to be reproduced and does not display item data on unnecessary music data not to be reproduced, these processes facilitate user's recognition of music data to be reproduced, resulting in easy edit of playlist data. When the display unit 13 displays only the item data on music data not to be reproduced, on the other hand, these processes make it easy for the user to edit playlist data such as picking out possible items to be deleted from the playlist data or changing a music data set entered as one not to be reproduced to as one to be reproduced.

When an item data set is newly added to playlist data, furthermore, the processes of steps S19 to S25 determine whether the item data set to be added has been already entered in the playlist data. If the playlist data has already contained the item data set, the existence of the item data set in the playlist data is informed, while the number of count the item data set has been entered is displayed. Therefore, these processes enable the user to recognize at a glance that the item data set that the user intends to add has been already entered, making it easy for the user to make an addition of item data to playlist data especially when the user does not desire overlapping entry of an item data set or contrarily when the user desires overlapping entry.

In carrying out the present invention, furthermore, it will be understood that the present invention is not limited to the above-described embodiment, but various modifications may be made without departing from the spirit and scope of the invention.

For instance, the above embodiment has been described as an example in which music data (e.g., MIDI data) is employed as a music item. Employed in replacement for or in addition to music data may be musical contents for reproducing music such as audio data, video data, karaoke data, ringing melody data, and data in which the above-described various data is combined.

In the above-described embodiment, furthermore, the determination process (steps S12, S16, S36, S38) of whether music data sets that have already been defined as those to be reproduced or a music data set that has just been defined as one to be reproduced are/is stored in the external storage device 25 to allow for the reproduction of the music data sets/set is carried out at the loading of playlist data, at the addition of music data to be reproduced, at the reloading of playlist data and at the saving of playlist data. In replacement for or in addition to the above-described conditions, the determination process may be automatically carried out at fixed intervals (e.g., every 10 minutes). In addition, it may be left up to individual users to decide whether to employ such automatic determination process.

In the above-described embodiment, if the path of a music data set associated with an item data set contained in playlist data is changed by a user, path data contained in the item data set may be also changed. In this case, user's operation for changing a path may be automatically sensed to automatically modify the path data in the item data set contained in the playlist data such that the path data agrees with the above-changed path. Alternatively, path data may be modified not in an automatic manner but in a manner in which the user is prompted to modify the path data. Furthermore, the automatic modification may be done such that the music data sets contained in the playlist data are searched on the basis of the title data in the item data for the music data set whose path has been changed by the user to automatically modify the path data contained in the item data to agree with the path of the music data set changed by the user. If the music data set cannot be found out, in this case, check mark data contained in the item data may be set to data representative of the irreproducibility mark of "???".

In the above-described embodiment, furthermore, display of items are done selectively. More specifically, display is controlled not to display items having the non-reproduction mark of "-" representative of that the music data set is not to be reproduced, or not to display items having the reproduction mark of "check" representative of those to be reproduced and the irreproducibility mark of "???" representing that the music data set is unable to be reproduced. Instead of the manner in which those items are controlled not to be displayed, those items may be grayed out to exclude from user-selectable items.

In the above-described embodiment, furthermore, only the music data sets defined as those to be reproduced are determined whether they are capable of being reproduced, and the determination result thereof is displayed. If processing time is not concerned, however, all the music data sets specified by the item data sets contained in playlist data may be determined whether they are capable of being reproduced, and the determination result thereof may be displayed.

In the above-described embodiment, furthermore, the present invention is applied to an electronic musical instrument having keys as performance operators. In replacement for the keys, however, the present invention may be applied to an electronic musical instrument having mere push switches, touch switches or the like as performance operators for defining pitch. In addition to the electronic musical instrument, the present invention can be applied to other electronic musical apparatuses that contain or are capable of acquiring music data sets such as karaoke apparatus, automatic performance apparatus, music amusement apparatus, and personal computer.

What is claimed is:

1. A music reproducing apparatus storing, in a storage device, playlist data defining an order in which a plurality of specified music items are to be reproduced, the music reproducing apparatus comprising:
    a Central Processing Unit (CPU);
    a memory
    a displaying portion for displaying the playlist data on a display unit;
    a reproducing portion for reproducing the plurality of specified music items in an order defined by the playlist data;
    a reproduction defining portion for defining, in the playlist data, reproduction defining data that define whether to reproduce the plurality of specified music items specified by the playlist data, wherein the playlist data contains reproduction time data representative of reproduction time of each of said plurality of specified music items;
    a total reproduction time display controlling portion for calculating, by use of the reproduction time data of each of said plurality of specified music items, a total reproduction time of said plurality of specified music items defined by the reproduction defining data as those to be reproduced amongst all music items, and displaying the calculated total reproduction time on the display unit along with said plurality of specified music items and non-specified music items that have been defined to not to be reproduced;
    a reproduction portion for allowing a user to select music data sets to reproduce so that the total reproduction time of the music data sets falls within an appropriate range;

a reproducibility display controlling portion for determining whether each of said plurality of specified music items defined by the reproduction defining data as one to be reproduced is in a state where reproduction is available, and displaying on the display unit whether each of said plurality of specified music items is in a state where reproduction is available; and a reproduction-determined item display controlling portion for displaying on the display unit at least ones of said plurality of specified music items defined as those to be reproduced.

2. The music reproducing apparatus according to claim 1 wherein the plurality of specified music items are stored in a music item storage device, and the playlist data contains path data representative of location where each of said plurality of specified music items are stored in the music item storage device, the music reproducing apparatus further comprising:

a path display controlling portion for displaying on the display unit the storage location by displaying an end portion of the path data.

3. A computer-readable storage medium containing a music reproducing program applied to a music reproducing apparatus which stores, in a storage device, playlist data defining an order in which a plurality of specified music items are to be reproduced, the program including the steps of:

displaying the playlist data on a display unit; reproducing the plurality of specified music items in an order defined by the playlist data;

defining, in the playlist data, reproduction defining data that define whether to reproduce the plurality of specified music items specified by the playlist data, wherein the playlist data includes reproduction time data representative of reproduction time of each of said plurality of specified music items;

calculating by use of the reproduction time data on the specified music items, a total reproduction time of said plurality of specified music items defined by the reproduction defining data as those to be reproduced amongst all music items and displaying the calculated total reproduction time on the display unit along with said plurality of specified music items and non-specified respective music items that have been defined to not to be reproduced;

receiving a user selection of music data sets to reproduce so that the total reproduction time of the music data sets falls within an appropriate range;

determining whether each of said plurality of specified music items defined by the reproduction defining data as one to be reproduced is in a state where reproduction is available, and displaying on the display unit whether each of said plurality of specified music items is in a state where reproduction is available; and a reproduction-determined item display controlling portion for displaying on the display unit at least ones of said plurality of specified music items defined as those to be reproduced.

* * * * *